United States Patent [19]

Ellingson

[11] 4,344,723
[45] Aug. 17, 1982

[54] VACUUM GRAIN MOVING APPARATUS

[75] Inventor: Hartley Ellingson, Wahpeton, N. Dak.

[73] Assignee: Frontier, Inc., Wahpeton, N. Dak.

[21] Appl. No.: 124,462

[22] Filed: Feb. 25, 1980

[51] Int. Cl.³ .................. B65G 53/60; B65G 53/58
[52] U.S. Cl. .................................. 406/53; 406/168; 406/170; 414/218; 415/213 R
[58] Field of Search ................ 406/42, 53, 168, 169, 406/170, 171, 173; 414/218, 398; 198/548, 670, 671; 415/213 R

[56] References Cited

U.S. PATENT DOCUMENTS

| | | |
|---|---|---|
| 886,335 | 4/1908 | Zempter .......................... 406/170 |
| 1,017,210 | 2/1912 | Grimes . |
| 1,100,992 | 6/1914 | Sallee . |
| 1,285,783 | 11/1918 | Nall . |
| 1,796,747 | 3/1931 | Colby et al. . |
| 2,035,410 | 3/1936 | Smith . |
| 2,114,728 | 4/1938 | Toohey . |
| 2,182,680 | 12/1939 | Rugg et al. . |
| 2,199,894 | 5/1940 | Phelps .......................... 406/53 |
| 2,542,910 | 2/1951 | Dosier . |
| 2,694,557 | 11/1954 | Reese et al. . |
| 2,714,833 | 8/1955 | Arquint . |
| 3,013,695 | 12/1961 | Caldwell, Jr. . |
| 3,219,394 | 11/1965 | Moss et al. . |
| 3,302,978 | 2/1967 | Scarnato et al. .............. 406/42 X |
| 3,667,814 | 6/1972 | Krivda . |
| 3,756,434 | 9/1973 | Teske ............................ 414/218 |
| 3,942,842 | 3/1976 | Young, Jr. . |
| 3,954,303 | 5/1976 | Boring . |
| 4,016,970 | 4/1977 | Wert . |
| 4,019,641 | 4/1977 | Merz ............................. 406/53 X |
| 4,082,366 | 4/1978 | Duff et al. . |

Primary Examiner—Jeffrey V. Nase
Attorney, Agent, or Firm—L. Paul Burd; Richard O. Bartz; Robert W. Gutenkauf

[57] ABSTRACT

A vacuum grain moving apparatus connected to a three-point hitch of a tractor and operated with the power take-off drive of the tractor. The apparatus has a grain holding tank connected to a grain collection hose used to carry grain and air to the tank. An air moving unit mounted on the tank has a rotatable power driven impeller that draws air from the center of the chamber of the tank to provide a vacuum pressure within the tank. The impeller has first and second generally radial blades that pump the air from the tank chamber. An auger conveyor operatively associated with the lower end of the tank moves the grain from the tank into a transport vehicle. The auger conveyor has a driven helical auger located within a tube. The tube extends beyond the outer end of the auger and retains a plug of grain in the tube to inhibit back flow of air into tank chamber during the running of the air moving unit. A swinging gate pivotally mounted on an outer end cap normally closes the exit opening of the tube. The closed gate restricts reverse flow of air in the tube during the starting period of the apparatus.

33 Claims, 12 Drawing Figures

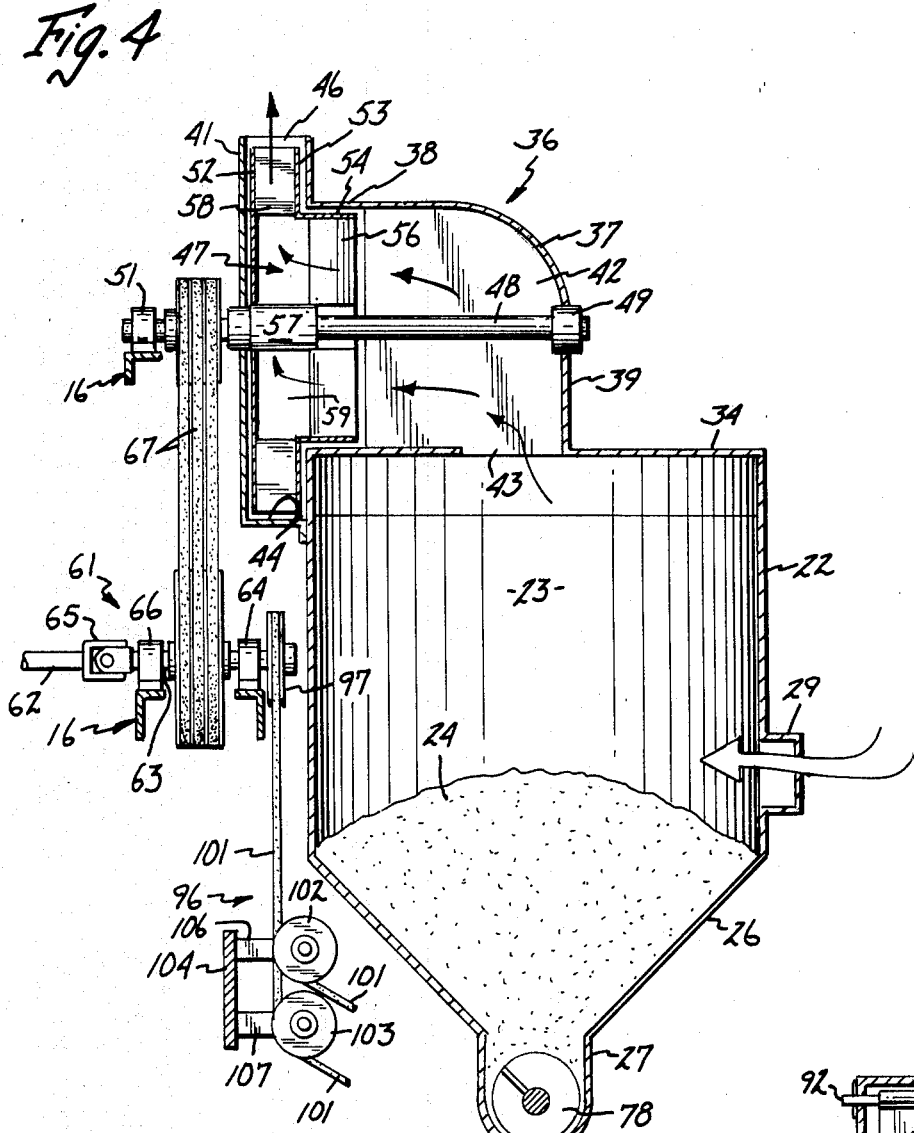
Fig. 4
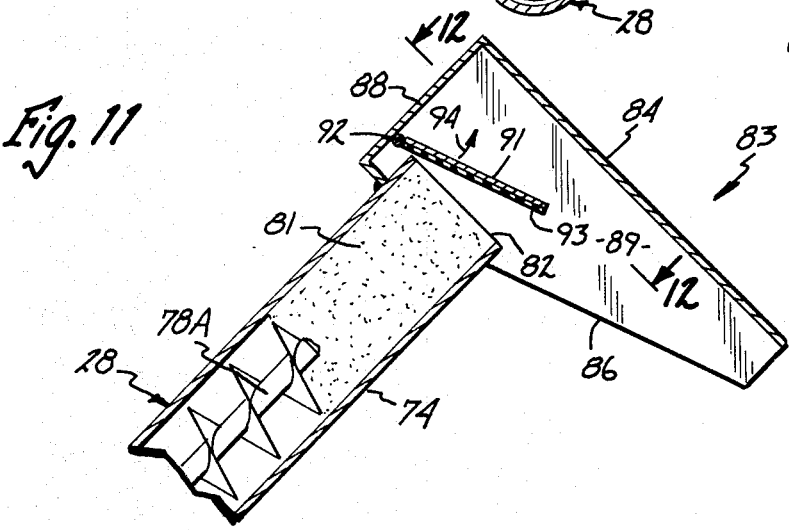
Fig. 11
Fig. 12

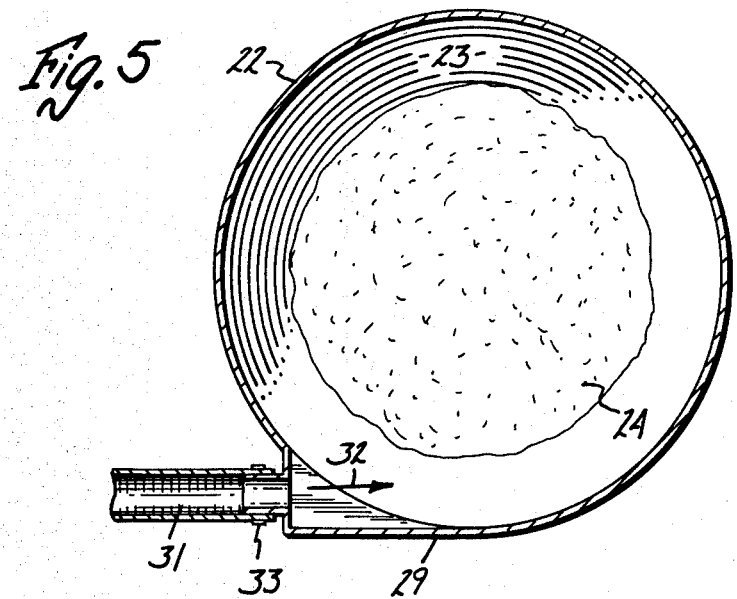
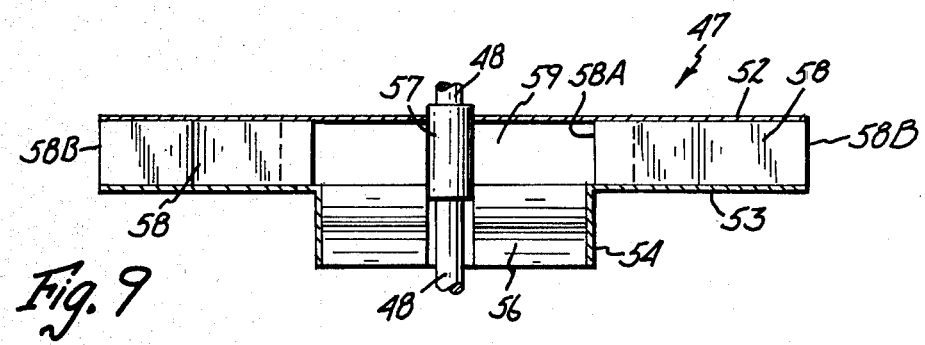
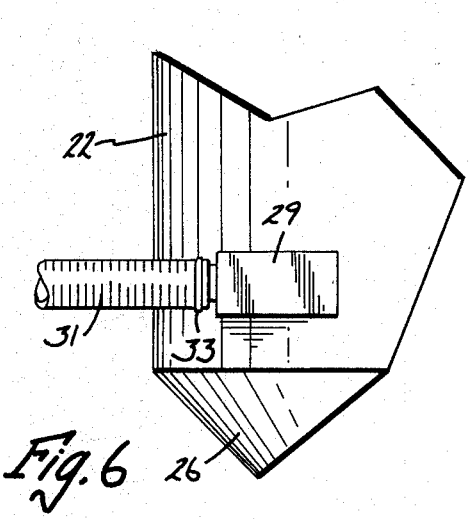 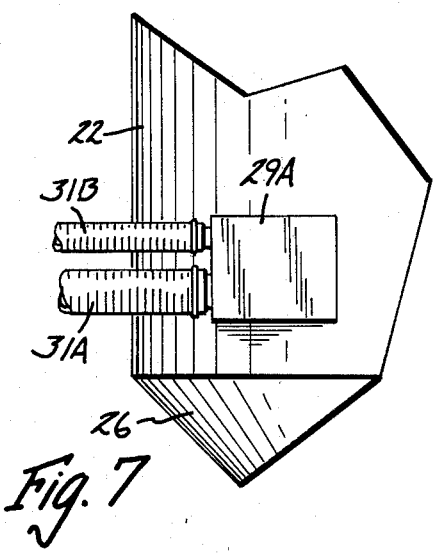

VACUUM GRAIN MOVING APPARATUS

SUMMARY OF THE INVENTION

The invention is related to an apparatus for transporting particulate material by entraining the particulate material in an air stream to move the particulate material to a collection area. A conveyor operates to move the particulate material from the collection area to a desired location, as a transport vehicle, conveyor, or the like. More particularly, the invention is directed to a vacuum apparatus for moving grain from a grain bin or grain storage area into a transport vehicle, such as a truck. The apparatus has a tank having an enclosed chamber for accommodating the grain. An elongated flexible collection hose is used to carry air and grain from a storage area into the chamber. The grain is discharged into the side of the chamber and separated from the air in the chamber.

A material discharge conveyor operatively connected to the bottom of the tank is used to remove the grain from the tank chamber and discharge the grain into the vehicle box. The discharge conveyor has an elongated tubular member having a passage accommodating a rotatable auger. The auger has a continuous helical flight which rotates to move grain along the passage of the tubular member. The auger terminates inwardly of the outer end of the tubular member whereby a quantity of grain closes or blocks the outer end of the passage. The grain in the outer end of the passage functions as a damper or valve to minimize the flow of air through the passage of the tubular member back into the tank chamber. This increases the vacuum efficiency of the apparatus as substantially all of the air and grain entering the chamber move through the collection hose.

A gate is pivotally mounted adjacent the outlet end of the tubular member to normally close the outlet end. The gate functions as a one-way valve preventing the reverse flow of air through the passage of the tubular member during the initial operation of the apparatus. The gate is located in an open bottom cap which serves to direct the grain in a downward direction into the vehicle box.

An air moving unit mounted on top of the tank operates to evacuate air from the tank chamber. The air moving unit has a housing having an inlet passage open to the top of the chamber and an outlet passage open to the atmosphere. An impeller means is located in the passage. The impeller means is mounted on a power driven shaft rotatably mounted on the housing. The impeller means has a plurality of inclined first blades surrounded by and attached to a sleeve. The impeller means further includes a plurality of second radial blades spaced from the first blades. The second blades are located between and secured to a pair of plates. One of the plates is attached to the sleeve and forms an impeller chamber between the first and second blades. The impeller means is a two-stage air moving means or pump. The first stage comprises a plurality of radially extended blades surrounded by the sleeve. The blades are inclined in a forward transverse direction and function on rotation of the impeller means to move air from the tank chamber into the impeller chamber. The second radial blades move the air from the impeller chamber and discharge the air through the outlet into the atmosphere. The second blades are greater in number and are disposed radially outwardly of the first blade members so that they have substantially the same or slightly greater air moving or pumping efficiency than the first blades 56. This reduces the pressure of the air in the impeller chamber thereby increasing the pumping effectiveness of the entire rotating impeller means. The impeller is power driven by the tractor through a belt and pulley power transmitting means. The power transmitting means also operates the auger in the discharge conveyor.

An object of the invention is to provide an apparatus that effectively and efficiently moves particulate material, such as grain, from a storage area into a transport vehicle. Another object of the invention is to provide a vacuum particulate material moving apparatus that is strong in construction, dependable in use, and economical to manufacture and operate. These and further objects of the invention are set out in the following detailed description.

IN THE DRAWINGS

FIG. 4 is an enlarged sectional view taken along line 4—4 of FIG. 3;

FIG. 5 is an enlarged sectional view taken along line 5—5 of FIG. 2;

FIG. 6 is a fragmentary side elevational view of the tank and inlet housing;

FIG. 7 is a view similar to FIG. 6 showing an inlet housing accommodating two hoses;

FIG. 9 is an enlarged sectional view taken along line 9—9 of FIG. 8;

FIG. 11 is an enlarged sectional view taken along line 11—11 of FIG. 1; and

FIG. 12 is an enlarged sectional view taken along line 12—12 of FIG. 11.

DESCRIPTION OF PREFERRED EMBODIMENT

Figure 1:
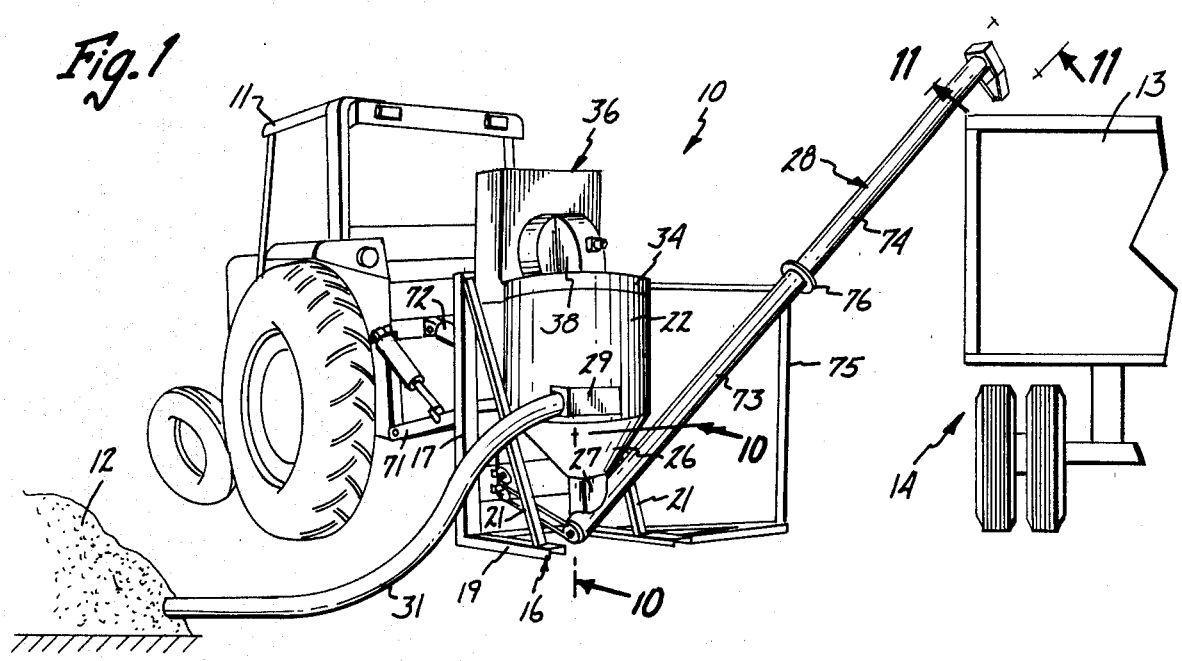
FIG. 1 is a perspective view of the material moving apparatus of the invention hitched to a tractor.

Referring to FIG. 1, there is shown material moving apparatus of the invention indicated generally at 10 coupled to a tractor 11. Apparatus 10 is operable to move particulate material 12, such as grain, into a box 13 of a vehicle 14. Vehicle 14 can be a truck or wagon. Other material moving means, such as conveyors, can be used in lieu of vehicle 14 to move the material to a desired location.

Material moving apparatus 10 has a frame indicated generally at 16 supported on the ground. Frame 16 has a pair of upright members or posts 17 and 18 attached at their lower ends to a base 19. Diagonal braces 21 extend from the upper ends of the posts 17 and 18 to base 19. A tank indicated generally at 22 is attached to the braces 21. Tank 22 has a chamber 23 for accommodating particulate material 24. Material 24 is stored grain, as wheat, corn, barley, oats, sunflower seeds, soybeans, and the like. Other types of particulate material can be handled by apparatus 10. The following description is directed to particulate material, as grain.

Tank 23 has an inverted cone-shaped bottom 26. The lower end of bottom 26 is connected to a downwardly directed tubular neck 27. An out or discharge conveyor indicated generally at 28 moves the grain that flows through neck 27 into box 13. The structure of conveyor 28 is hereinafter described.

An inlet housing 29, as shown in FIGS. 1, 2, 4, and 6, is attached to the side of tank 22 adjacent the top of bottom 26. An elongated flexible collection hose 31 is connected to housing 29 with a clamp 33. Hose 31 has a length which allows its open free end to be moved into the pile of grain 12. Sections of hose 31 can be coupled together end-to-end to provide hose 31 with sufficient lengths to transport the material from the pile into the tank 22. Housing 29 has a box shape with a side wall that is located generally tangential to the wall of tank 22. As shown in FIG. 5, the air and grain move in a tangential direction into tank chamber 23.

Referring to FIG. 7, a modified inlet housing 29A is attached to the side of tank 22. Housing 29A is connected to a large inlet flexible collection hose 31A and a small flexible collection hose 31B. The large hose 31A is used to transport a relatively large volume of air and grain into tank chamber 23. Each hose 31A and 31B has an open free end which is moved into the grain whereby the vacuum pressure within tank 22 causes the grain to flow through the hoses into tank chamber 23. The small hose 31B is used to remove the grain from the corners and areas where the large hose 31A cannot effectively pick up grain.

The top of tank 22 is closed with a top wall 34. An air moving unit indicated generally at 36 is mounted on wall 34. Unit 36 has a housing 37 surrounding air inlet chamber 42 and air outlet chamber 44. Housing 37 has a top wall 38, a front wall 39, and rear wall 41. Top wall 34 has an inlet opening 43 providing a passage from the top of chamber 23 into inlet chamber 42. The top of housing 36 has an outlet or discharge opening 46. A rotatable impeller or rotor indicated generally at 47 is located in chambers 42 and 44. Rotor 47 is mounted on a horizontal shaft 48. The forward end of shaft 48 is rotatably mounted in a bearing 49 attached to wall 39. The opposite end of shaft 48 is rotatably mounted in a bearing 51 mounted on the frame portion 16.

Figure 8:
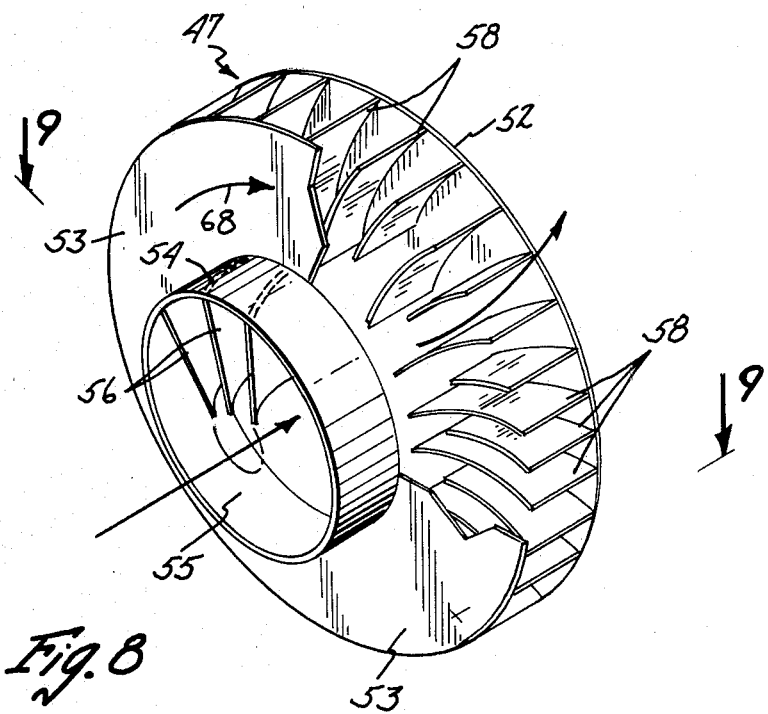
FIG. 8 is a perspective view with the parts broken away of the rotor of the air moving unit.

As shown in FIGS. 8 and 9, rotor 47 has a circular back plate 52 and a front plate 53. Front plate 53 has a central hole surrounded by a forwardly directed annular sleeve 54. Sleeve 54 surrounds an inlet passage 55 accommodating a plurality of first vanes or blades 56. Blades 56 are secured at their outer ends to the inside of sleeve 54 and their inner edges to a central hub 57. Hub 57 surrounds and is attached with a key or splines to shaft 48. Referring to FIG. 8, each blade has a forward transverse concave surface and a forward edge transversely aligned with the inlet end of sleeve 54. Blades 56 are angled in the direction of rotation of the rotor 47. Each blade 56 is at an acute angle relative to a plane intersecting the blade and passing through the axis of rotation of rotor 47. Preferably, the angle is 35 degrees.

A plurality of circumferentially spaced second blades 58 are located between the plates 52 and 53. The blades have inner edges 58A that are generally aligned with sleeve 54 and outer edges 58B that are located in alignment with the outer edges of plates 52 and 53. Alternate blades 58 have inner edges that are located radially outwardly of the remaining blades. Each blade 58 has a radial concave curvature in the direction of rotation of rotor 47. A vacuum chamber 59 is located adjacent the inside of the first blades 56 and the inlet portions or inner ends 58A of the blades 58. Impeller chamber 59 reduces the pressure of the air behind first blades 56 thereby increasing the air pumping efficiency of blades 58.

As shown in FIG. 4, impeller rotor 46 is mounted on shaft 48 with hub 57 secured to shaft 48 so that the rotor 47 rotates with shaft 48. The back wall 52 is located in contiguous relationship with the inside of the rear wall 41 of the housing. Wall 52 is parallel and close to the inside of wall 41. The front plate 53 is located adjacent the front wall of the housing. The sleeve 54 is located in a circular portion 38 of housing 37. Plates 52 and 53 and sleeve 54 are located in close relationship to be adjacent stationary walls of housing 37 and back wall 41.

Referring to FIG. 4, a drive structure indicated generally at 61 couples a power takeoff drive shaft 62 to shaft 48 to rotate rotor 47. Drive structure 61 includes a shaft 63 rotatably carried in bearings 64 and 66 mounted on transverse supports of the frame 16. The power takeoff shaft 62 is drivably connected to the shaft 63 with a universal joint 65. The power is transmitted from shaft 63 to shaft 48 through a belt and pulley power transmission 67. When power is applied to shaft 63, the rotor 47 is driven in the direction of the arrow 68, as shown in FIG. 8.

Figure 2:
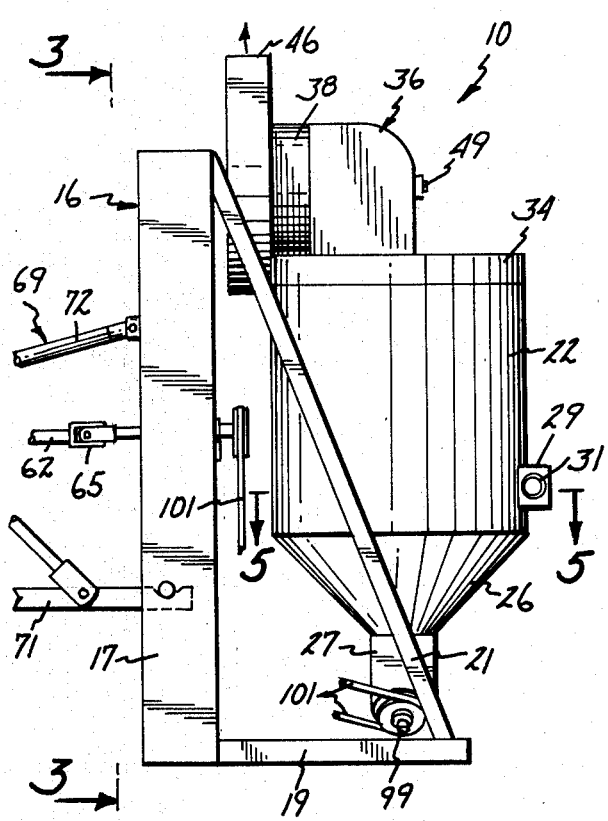
FIG. 2 is a side view of the material moving apparatus.
Figure 3:
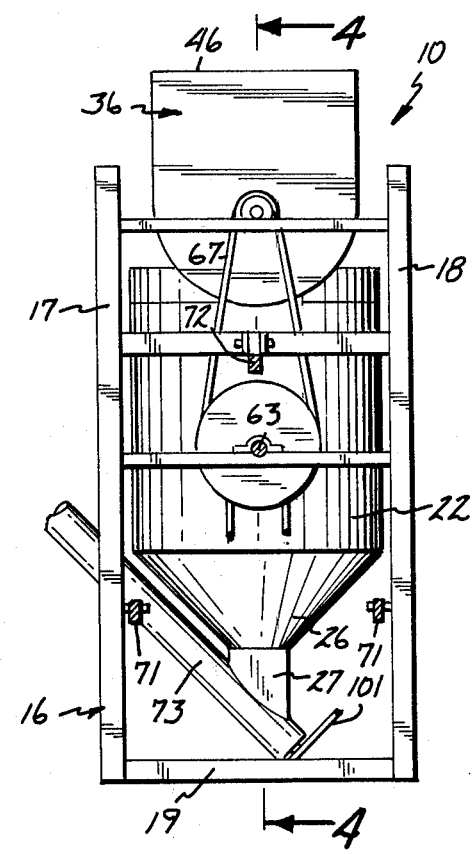
FIG. 3 is a sectional view taken along line 3—3 of FIG. 2.

Tractor 11 has a conventional three-point hitch, indicated generally at 69 in FIG. 2, that is coupled to frame 16 to stabilize the frame. Hitch 69 is also operable to raise the material moving apparatus 10 from the ground so that it can be transported to a new location. Hitch 69 has a pair of draft links 71 that are connected to frame posts 17 and 18. A top control link 72 is connected to an upper portion of frame 16. Frame 16 can be mounted on two wheel trailer structure connected to the draw bar of tractor 11.

Figure 10:
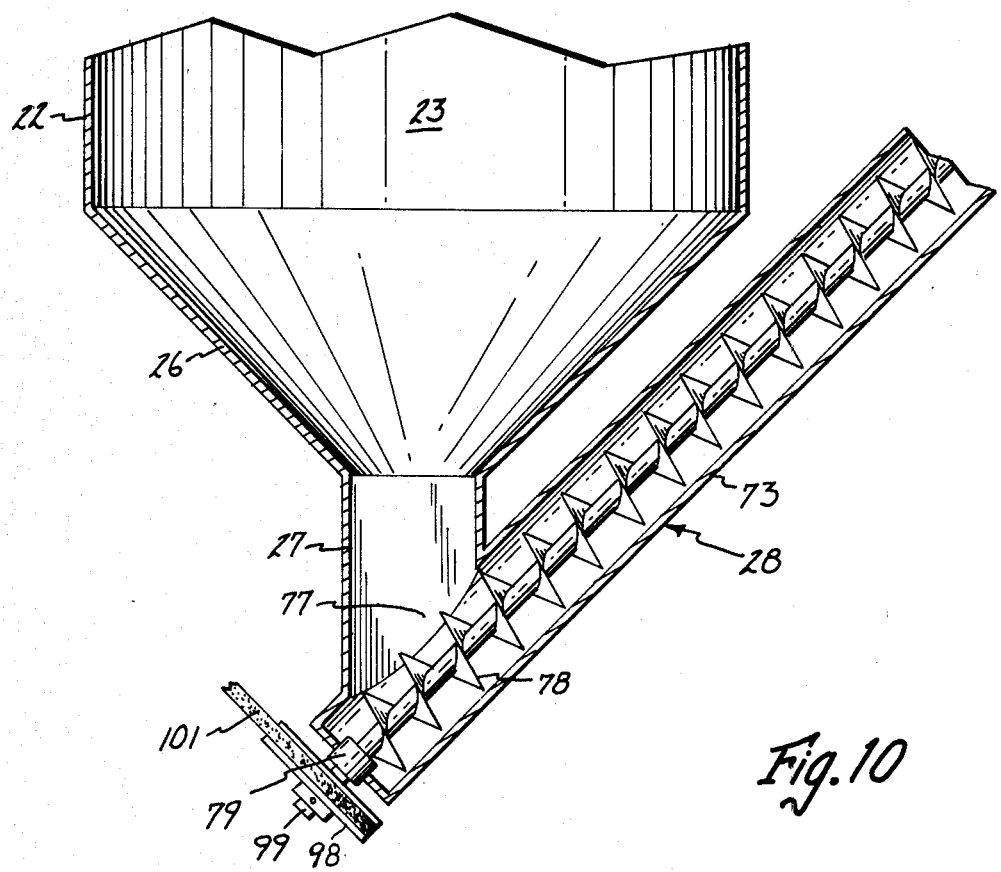
FIG. 10 is an enlarged sectional view taken along line 10—10 of FIG. 1.

Returning to FIG. 1, conveyor 28 has two end-to-end tubes 73 and 74 joined together with connecting flanges 76. The lower end of tube 73, shown in FIG. 10, has an inlet opening 77 aligned with the passage of tubular neck 27. A grain moving means or elongated continuous helical flight auger 78 is located in the passages of tubes 73 and 74. A bearing 79 rotatably mounts the lower end of auger 78 on the end of tube 73. As shown in FIG. 11, the outer or free end 78A of auger 78 terminates inwardly from the outer end 82 of tube 74. The space between the auger end 78A and end 82 accommodates a plug of grain 81. Grain 81 acts as a damper or plug which prevents air from flowing back into chamber 23 via the passages of the tubes 73 and 74.

A cap indicated generally at 83 is mounted on the outer end of tube 74 to direct the grain discharged through the end 83 into box 13 or other desired location. Cap 83 has a top wall 84 joined to side walls 86 and 87. The upper end of the cap 83 is closed with an end wall 88. Cap 83 has an open bottom passage 89 located below and outwardly of the end of tube 74. A swinging plate 91 is located in passage 89 adjacent the circular end of pipe 74. A transverse pivot rod 92 pivotally mounts gate 91 on side walls 87 and 86 in a manner allowing gate 91 to swing to a closed position in engagement with the end 82 of tube 74. The inside of gate 91 has a flexible sheet member 93 which facilitates the sealing of gate 91 against the end 82 of tube 74. Gate 91 normally is located in a closed position so that when apparatus 10 commences operation gate 91 being closed prevents the air from moving down through the passages of tubes 73 and 74. The air moves into suction hose 31 to carry the grain into the tank chamber 23. On operation of auger 78, the grain moves up the passages of tube 73 and tube 74 and forces gate 91 to swing to an open position as indicated in the direction of arrow 94. The grain moving through the end 82 will hold gate 91 in the open position.

Returning to FIGS. 4 and 10, a drive structure indicated generally at 96 drivably connects shaft 63 to auger 78 so that auger 78 will rotate when the power takeoff shaft 62 is operated by tractor 11. The drive structure 96 has a first pulley 97 mounted on shaft 63 and a second pulley 98 mounted on shaft 99 and connected to auger 78. An endless flexible belt 101 is trained about pulley 97 and 98. Belt 101 engages a pair of idler pulleys 102 and 103 which apply tension on the belt and direct the belt to the pulleys 97 and 98. Idler pulleys 102 and 103 are adjustably mounted on transverse frame member 104. Brackets 106 and 107 connect the pulleys 102 and 103 to frame member 104. Other drive structures can be used to power auger 78.

In use, the material moving apparatus 10 is initially connected to the three-point hitch of the tractor 11. The conventional power takeoff drive is connected to the shaft 62 whereby the tractor can simultaneously provide power to the air moving means 36 and the discharge conveyor 28.

Apparatus 10 is transported with the tractor 11 to a desired location adjacent the storage area or bin for grain 12. The elongated flexible collection hose 31 is moved into the stored grain 12 so that hose 31 functions as a grain and air delivery hose for carrying grain to the tank chamber 23. Hose 31 is connected to the side inlet housing 29. As shown in FIG. 5, the grain moves in a tangential direction as it enters chamber 23. The grain falls to the bottom of the chamber 23 and is thereby separated from the air.

An air moving means 36 operates to remove air from the top of the chamber and discharge the air into the atmosphere, thereby establishing a vacuum pressure in the chamber. The air moving means also functions to separate dust and light chaft from the grain as these materials are carried by the air stream through the air moving means. The air moving means has a rotating impeller. The rotating impeller has a first blade means 56 that operates to initially move air from the chamber 23 and discharge the air into an impeller chamber 59. A second plurality of radially extended blades 58 move the air from the impeller chamber 59 and discharge the air into the atmosphere. The speed of the impeller 47 can be increased and thereby increases the vacuum pressure in the tank chamber 23. This increases the suction force on the inlet hose 31 and allows for a greater flow of grain through hose 31 into tank chamber 23. The grain 24 in the bottom of the tank chamber 23, as well as the grain in the discharge conveyor and the quantity of grain in the outlet end of the discharge conveyor, inhibits the back flow of air through the tubular member of the discharge conveyor into the tank chamber 23. This insures a maximum suction effectiveness of collection hose 31.

While there has been shown and described the preferred embodiment of the particulate material moving apparatus, it is understood that changes in the structure, such as the drive system, transport structure, tank, and other parts and arrangement of parts, may be made by those skilled in the art without departing from the invention. The invention is defined in the following claims.

The embodiments of the invention in which an exclusive property or privilege is claimed are defined as follows:

1. An apparatus for moving particulate material, such as grain, comprising: a frame, tank means mounted on the frame, said tank means having a first chamber for accommodating particulate material, first means having a first passage for carrying air and particulate material from a source of particulate material to the first chamber, second means cooperating with the tank means for removing particulate material from the first chamber, said second means including tubular means having a second passage, an inlet end open to the second passage and the first chamber, an outlet end open to the second passage, material moving means located in said second passage of the tubular means operable to move material from the inlet end toward the outlet end, said material moving means having an end located in the second passage and terminating inwardly of the outlet end a distance so that particulate material blocks the outlet end of said second passage, drive means for operating said material moving means, air moving means mounted on the tank means operable to evacuate air from the first chamber of the tank means, said air moving means comprising a housing defining a second chamber having a cylindrical section, an inlet passage open to the first and second chambers, and an outlet passage open to the second chamber and the atmosphere, an impeller means located in said second chamber operable to move air from the first chamber to the atmosphere, said impeller means having a plurality of first blades, a sleeve surrounding and attached to the first blades, a plurality of second blades spaced from the first blades, a pair of plates secured to opposite portions of the second blades, one of said plates being attached to said sleeve, said sleeve being located in said cylindrical section, means rotatably mounting the impeller means on said housing, and means for rotating the impeller means.

2. The apparatus of claim 1 wherein: said tank means has a downwardly directed cone-shaped bottom open to the inlet end of the second passage, and a top wall having a central outlet opening open to the inlet passage of the air moving means.

3. The apparatus of claim 1 wherein: the first means includes an inlet housing mounted on the tank means and hose means connected to the inlet housing, said hose means having said first passage to direct air and particulate material into the inlet housing, said inlet housing directing the air and particulate material tangentially into said first chamber of the tank means.

4. The apparatus of claim 3 wherein: the hose means includes a plurality of hoses for carrying air and particulate material.

5. The apparatus of claim 4 wherein: at least one of said hoses is smaller in diameter than the remaining hoses.

6. The apparatus of claim 1 wherein: the material moving means is an auger having helical flight means, said auger being rotated by said drive means whereby the helical flight means moves particulate material in the passage of the tubular means.

7. The apparatus of claim 1 including: means mounted on the tubular means to direct particulate material to a desired location, gate means for closing the outlet end of the tubular means, and means movably mounting the gate means on the means mounted on the tubular means whereby the gate means normally closes the inlet end of the tubular means and moves to an open position in response to movement of particulate material through the outlet end of the tubular means.

8. The apparatus of claim 7 wherein: the means movably mounting the gate means includes pivot means allowing the gate means to pivot relative to the outlet end of the tubular means.

9. The apparatus of claim 7 wherein: the means mounted on the tubular means includes a top wall, a pair of side walls joined to the top wall, and a back wall joined to the top wall and side walls, said walls surrounding a passage open to the outlet end of the tubular means to direct particulate material to a desired location.

10. The apparatus of claim 9 wherein: said gate means is located between said side walls.

11. The apparatus of claim 10 wherein: said means movably mounting the gate means includes pivot means mounted on said side walls.

12. The apparatus of claim 1 including: gate means for closing the outlet end of the tubular means, and means movably mounting the gate means to allow the gate means to move from a first position closing said outlet end to a second position opening said outlet end.

13. The apparatus of claim 12 wherein: the means movably mounting the gate means includes pivot means allowing the gate means to swing between said first and second positions.

14. The apparatus of claim 1 wherein: said housing of the air moving means includes a first side wall attached to the cylindrical section, and a second side wall laterally spaced from the first side wall, said pair of plates of the impeller means being located between said first and second side walls.

15. The apparatus of claim 1 wherein: the first blades are transversely angled in the direction of rotation of the impeller means.

16. The apparatus of claim 1 wherein: the second blades are radially inclined in the direction of rotation of the impeller means.

17. The apparatus of claim 1 wherein: the first blades are transversely angled in the direction of rotation of the impeller means, and said second blades are radially inclined in the direction of rotation of the impeller means.

18. The apparatus of claim 1 wherein: some of the second blades have radial inner edges generally aligned with the sleeve.

19. The apparatus of claim 1 wherein: said pair of plates of the impeller means provide a chamber between the first blades and second blades.

20. The apparatus of claim 1 wherein: the drive means for operating said material moving means, and the means for rotating the impeller means includes power transmission means operably connected to a power source.

21. An apparatus for moving particulate material, such as grain, comprising: tank means having a first chamber for accommodating particulate material, first means having a first passage for carrying air and particulate material from the source of particulate material to the first chamber, second means cooperating with the tank means for removing particulate material from said first chamber, air moving means operable to evacuate air from the first chamber of the tank means to establish a vacuum pressure in said first chamber whereby air and particulate material move through the first passage of the first means to carry particulate material to the first chamber, said air moving means including a housing defining a second chamber having a cylindrical section, an inlet passage open to the first and second chambers, an outlet passage open to the second chamber and atmosphere, and impeller means located in said second chamber operable to move air from the first chamber to the atmosphere, said impeller means having a first blade means, a sleeve surrounding and secured to the first blade means, second blade means located adjacent the first blade means, and plate means secured to the second blade means, said sleeve being located in the cylindrical section of the housing, means rotatably mounting the impeller means on said housing, and means for rotating the impeller means.

22. The apparatus of claim 21 wherein: said tank means has a downwardly directed cone-shaped bottom section, said bottom section being in communication with the second means whereby particulate material is removed from the bottom of the tank means by the second means.

23. The apparatus of claim 21 wherein: said tank means includes a top wall having a central outlet opening open to the inlet passage of the air moving means.

24. The apparatus of claim 21 wherein: the first means includes an inlet housing mounted on the tank means, and hose means having said first passage connected to the inlet housing to carry air and particulate material into the inlet housing, said inlet housing directing the air and particulate material tangentially into the chamber of said tank means.

25. The apparatus of claim 24 wherein: the means connected to the inlet housing includes a plurality of hoses for carrying air and particulate material to said inlet housing.

26. The apparatus of claim 25 wherein: at least one of said hoses is smaller in diameter than the remaining hoses.

27. The apparatus of claim 21 wherein: said housing of the air moving means includes a first side wall attached to the cylindrical section, and a second side wall laterally spaced from the first side wall, said plate means of the impeller means being located between said first and second side walls.

28. The apparatus of claim 27 wherein: said plate means comprise a pair of plates, said second blade means being located between and secured to said pair of plates, said pair of plates being located in contiguous relationship relative to said first and second side walls.

29. The apparatus of claim 21 wherein: said first blade means comprising a plurality of first blades circumferentially spaced from each other around said sleeve, each first blade being transversely angled in the direction of rotation of the impeller means.

30. The apparatus of claim 21 wherein: said second blade means includes a plurality of second blades circumferentially spaced around said plate means, said second blades being radially inclined in the direction of rotation of the impeller means.

31. The apparatus of claim 21 wherein: said first blade means comprise a plurality of first blades transversely aligned in the direction of rotation of the impeller means, and said second blade means comprise a plurality of second blades radially inclined in the direction of rotation of the impeller means.

32. The apparatus of claim 21 wherein: some of the second blade means have radial inner edges generally aligned with the sleeve.

33. The apparatus of claim 21 wherein: said plate means of the impeller means comprise a pair of plates providing a chamber between said first blade means and said second blade means.

* * * * *

UNITED STATES PATENT AND TRADEMARK OFFICE
CERTIFICATE OF CORRECTION

PATENT NO. : 4,344,723
DATED : August 17, 1982
INVENTOR(S) : Hartley Ellingson

It is certified that error appears in the above-identified patent and that said Letters Patent are hereby corrected as shown below:

Column 4, line 6, "46" should be -- 47 --.

Column 4, line 14, "to be" should be -- to the --.

Signed and Sealed this

Third Day of May 1983

[SEAL]

Attest:

GERALD J. MOSSINGHOFF

Attesting Officer

Commissioner of Patents and Trademarks